United States Patent
Peters et al.

(10) Patent No.: US 10,681,799 B2
(45) Date of Patent: Jun. 9, 2020

(54) PLASMA ARC CUTTING SYSTEM, INCLUDING NOZZLES AND OTHER CONSUMABLES, AND RELATED OPERATIONAL METHODS

(71) Applicant: Hypertherm, Inc., Hanover, NH (US)

(72) Inventors: John Peters, Canaan, NH (US); Brian J. Currier, Newport, NH (US); Madhura S. Mitra, Lebanon, NH (US); Soumya Mitra, Lebanon, NH (US)

(73) Assignee: Hypertherm, Inc., Hanover, NH (US)

( * ) Notice: Subject to any disclaimer, the term of this patent is extended or adjusted under 35 U.S.C. 154(b) by 479 days.

(21) Appl. No.: 15/484,182

(22) Filed: Apr. 11, 2017

(65) Prior Publication Data
US 2017/0295635 A1 Oct. 12, 2017

Related U.S. Application Data

(60) Provisional application No. 62/320,935, filed on Apr. 11, 2016.

(51) Int. Cl.
*B23K 10/00* (2006.01)
*H05H 1/28* (2006.01)
(Continued)

(52) U.S. Cl.
CPC ............... *H05H 1/28* (2013.01); *B23K 10/00* (2013.01); *B23K 10/006* (2013.01);
(Continued)

(58) Field of Classification Search
CPC .......... H05H 1/34; H05H 1/28; H05H 1/3405; H05H 1/38; H05H 2001/3436;
(Continued)

(56) References Cited

U.S. PATENT DOCUMENTS 2,538,521 A 1/1951 Hunting
2,602,673 A 7/1952 Deuring et al.
(Continued)

FOREIGN PATENT DOCUMENTS

CN 87207977 U 1/1988
CN 201618865 U 11/2010
(Continued)

*Primary Examiner* — Mark H Paschall
(74) *Attorney, Agent, or Firm* — Proskauer Rose LLP (57) ABSTRACT

A nozzle for a liquid-cooled plasma arc torch is provided. The nozzle includes a thermally conductive body having a distal end, a proximal end, and a longitudinal axis extending therethrough. The nozzle also includes a plasma arc exit orifice at the distal end of the thermally conductive body. The nozzle additionally includes a cooling waist located circumferentially about an exterior surface of the thermally conductive body. The cooling waist includes a liquid inlet slope, a liquid outlet slope and a heat exchange region between the liquid inlet slope and the liquid outlet slope. The heat exchange region extends substantially parallel to the longitudinal axis, and the liquid inlet slope and the liquid outlet slope are oriented generally perpendicular to the longitudinal axis.

22 Claims, 4 Drawing Sheets

(51) Int. Cl.
   *H05H 1/34* (2006.01)
   *B23K 37/00* (2006.01)
   *H05H 1/38* (2006.01)

(52) U.S. Cl.
   CPC ............ *B23K 37/003* (2013.01); *H05H 1/34* (2013.01); *H05H 1/3405* (2013.01); *H05H 1/38* (2013.01); *H05H 2001/3436* (2013.01); *H05H 2001/3468* (2013.01)

(58) Field of Classification Search
   CPC ............ H05H 2011/3468; B23K 10/00; B23K 10/006; B23K 37/003
   USPC .............. 219/121.49, 121.5, 121.51, 121.52, 219/121.39, 75
   See application file for complete search history.

(56) References Cited

U.S. PATENT DOCUMENTS

| | | | |
|---|---|---|---|
| 3,116,405 A | 12/1963 | Browning et al. | |
| 3,294,953 A | 12/1966 | Spies, Jr. | |
| 3,463,957 A | 8/1969 | Fuksiewicz | |
| 4,312,513 A | 1/1982 | Swenson | |
| 4,645,899 A * | 2/1987 | Bebber | H05H 1/34 219/121.48 |
| 5,317,126 A * | 5/1994 | Couch, Jr. | H05H 1/34 219/121.48 |
| 5,328,516 A | 7/1994 | Dietiker | |
| 5,893,985 A | 4/1999 | Luo et al. | |
| 5,965,040 A | 10/1999 | Luo et al. | |
| 5,977,510 A | 11/1999 | Lindsay | |
| 8,338,740 B2 * | 12/2012 | Liebold | H05H 1/28 219/121.5 |
| 2004/0140629 A1 | 1/2004 | Onyszkiewicz et al. | |
| 2004/0200810 A1 * | 10/2004 | Brandt | H05H 1/28 219/121.49 |
| 2008/0217305 A1 | 9/2008 | Sanders | |
| 2010/0078408 A1 | 4/2010 | Liebold et al. | |
| 2012/0055906 A1 | 3/2012 | Shipulski et al. | |
| 2016/0221108 A1 * | 8/2016 | Hoffa | B23K 10/006 |
| 2016/0360601 A1 * | 12/2016 | Currier | H05H 1/28 |
| 2017/0042014 A1 * | 2/2017 | Sanders | B23K 9/285 |

FOREIGN PATENT DOCUMENTS

| | | |
|---|---|---|
| CN | 202224681 U | 5/2012 |
| DE | 10203667 A1 | 7/2003 |
| EP | 1184111 A1 | 6/2002 |
| EP | 2563100 A1 | 2/2013 |
| KR | 1349949 B1 | 1/2014 |
| WO | 2012118834 A1 | 7/2012 |
| WO | 2015012973 A1 | 1/2015 |

* cited by examiner

PLASMA ARC CUTTING SYSTEM, INCLUDING NOZZLES AND OTHER CONSUMABLES, AND RELATED OPERATIONAL METHODS

CROSS REFERENCE TO RELATED APPLICATION

This application claims the benefit of and priority to U.S. Provisional Patent Application No. 62/320,935, filed Apr. 11, 2016, which is owned by the assignee of the instant application and incorporated herein by reference in its entirety.

TECHNICAL FIELD

The present invention generally relates to the field of plasma arc cutting systems and processes. More specifically, the invention relates to improved consumable components (e.g., nozzles) and operational methods for cooling a plasma arc torch.

BACKGROUND

Plasma arc torches are widely used for high temperature processing (e.g., heating, cutting, gouging and marking) of materials. A plasma arc torch generally includes a torch head, an electrode mounted within the torch head, an emissive insert disposed within a bore of the electrode, a nozzle with a central exit orifice mounted within the torch head, a shield, electrical connections, passages for cooling, passages for arc control fluids (e.g., plasma gas) and a power supply. A swirl ring can be used to control fluid flow patterns in the plasma chamber formed between the electrode and the nozzle. In some torches, a retaining cap is used to maintain the nozzle and/or swirl ring in the plasma arc torch. In operation, the torch produces a plasma arc, which is a constricted jet of an ionized gas with high temperature and sufficient momentum to assist with removal of molten metal. Gases used in the torch can be non-reactive (e.g., argon or nitrogen), or reactive (e.g., oxygen or air).

Design considerations for a plasma arc torch include features for cooling, since a plasma arc generated can produce temperature in excess of 10,000° C., which, if not controlled, can destroy the torch, particularly the nozzle. That is, the erosion rate of a nozzle is affected by the cooling efficiency at the nozzle. Efficient cooling can help to maintain a relatively low temperature, which leads to a lower erosion rate. Prior art nozzles, such as the nozzles described in U.S. Pat. No. 8,772,667, include a toroidal chamber configured to allow fluid flows through and along the chamber to promote convective cooling of the nozzle. Specifically, a fluid enters the chamber from one side of the nozzle, flows around the nozzle within the chamber to the other side of the nozzle, and exits the nozzle from the opposite side of the nozzle. Such convective cooling tends to promote turbulence in the fluid flow and results in unevenness in cooling as the cooling fluid enters one side of the nozzle and exit from the opposite side at a warmer temperature. There is a need for nozzle cooling features that can provide smooth, laminar fluid flows while enabling uniform cooling around substantially the entire circumference of the nozzle.

SUMMARY

It is therefore an objective of the present invention to provide nozzle designs that optimize coolant flow through the nozzles, thereby improving service life of the nozzles and increasing cut quality. In some embodiments, a cooling waist is provided around an external surface of a nozzle to enable laminar coolant flow and uniform nozzle cooling about the perimeter of the nozzle.

In one aspect, a nozzle for a liquid-cooled plasma arc torch is provided. The nozzle includes a thermally conductive body having a distal end, a proximal end, and a longitudinal axis extending therethrough. The nozzle also includes a plasma arc exit orifice at the distal end of the thermally conductive body. The nozzle additionally includes a cooling waist located circumferentially about an exterior surface of the thermally conductive body. The cooling waist includes a liquid inlet slope, a liquid outlet slope and a heat exchange region between the liquid inlet slope and the liquid outlet slope. The heat exchange region extends substantially parallel to the longitudinal axis, and the liquid inlet slope and the liquid outlet slope are oriented generally perpendicular to the longitudinal axis. The nozzle further includes a first sealing member located between the liquid outlet slope and the distal end of the thermally conductive body, and a second sealing member located between the proximal end of the thermally conductive body and the liquid inlet slope.

In some embodiments, the liquid inlet slope and the liquid outlet slope are at different axial locations in relation to the longitudinal axis. In some embodiments, the liquid inlet slope comprises an axial alignment flange configured to axially align the nozzle with another component of the plasma arc torch.

In some embodiments, the cooling waist is generally located in a center portion of the body. In some embodiments, the cooling waist is configured to facilitate a laminar flow of a liquid coolant therethrough, such that the liquid coolant entering the liquid inlet slope does not substantially intermingle with the liquid coolant exiting from the liquid outlet slope.

In some embodiments, the nozzle further comprises a third sealing member located between the second sealing member and the proximal end of the body. In some embodiments, a vent hole is located between the third sealing member and the second sealing member. The vent hole is configured to connect an interior surface of the body to the exterior surface of the body. A supply hole is located between the third sealing member and the proximal end of the body. The supply hole is configured to connect an exterior surface of the body to the interior surface of the body. A vent hole is located between the first sealing member and the distal end of the body. The vent hole is configured to connect an interior surface of the body to a shield gas supply channel.

In some embodiments, a retaining cap is coupled to the exterior surface of the nozzle body to define a chamber in cooperation with the cooling waist. In some embodiments, the chamber has a volume of about 0.03 cubic inches.

In another aspect, a nozzle for a liquid cool plasma torch is provided. The nozzle includes a body having a distal end, a proximal end, and a longitudinal axis extending therethrough. The nozzle also includes a plasma arc exit orifice disposed at the distal end of the body. The nozzle additionally includes a cooling means centrally located on an exterior surface of the body between the distal end and the proximal end. The cooling means is circumferentially oriented about the body. The cooling means has an inlet means for receiving a liquid coolant and an outlet means for redirecting the liquid coolant radially outward in a laminar flow pattern. The inlet and the outlet means are axially spaced from one another. The nozzle further includes a first sealing means located between the outlet means and the distal end of the body, and a second sealing means located between the inlet means and the proximal end of the body.

In some embodiments, the nozzle includes at least one venting means disposed in the body. In some embodiments, the cooling meanings is configured to prevent liquid coolant in the inlet means from intermingling with the liquid coolant in the outlet means.

In yet another aspect, a method is provided for liquid cooling a plasma-cutting nozzle in a plasma arc torch. The nozzle has a body with a distal end, a proximal end, and a longitudinal axis extending therethrough. A cooling waist is located circumferentially about an exterior surface of the body in a central portion of the body between the distal end and the proximal end. The method includes directing a liquid coolant flow along an inlet slope of the cooling waist at an angle generally perpendicular to the longitudinal axis. The method also includes conducting the liquid coolant flow along a heat exchange region of the cooling waist substantially parallel to the longitudinal axis. The heat exchange region is located between the inlet slope and an outlet slope of the cooling waist. The method further includes directing the liquid coolant flow over the outlet slope radially away from the nozzle at an angle generally perpendicular to the longitudinal axis, the outlet slope distal to the inlet slope. The liquid coolant flow through the cooling waist comprises a substantially laminar flow such that the liquid coolant flow through the inlet slope does not substantially intermingle with the liquid coolant flow over the outlet slope.

In some embodiments, the method further comprises sealing the nozzle at one or more of a first sealing location between the outlet slope and the distal end of the body, a second sealing location between the proximal end of the body and the inlet slope, and a third sealing location between the second sealing member and the proximal end of the body. In some embodiments, the method further comprises venting at least a portion of a gas flow through at least one of a first vent hole located between the third sealing location and the second sealing location and a second vent hole between the first sealing location and the distal end of the body. In some embodiments, the method further comprises supplying a gas flow into an interior region of the nozzle through a supply hole located between the third sealing location and the proximal end of the body.

In some embodiments, the method includes coupling a retaining cap to the exterior surface of the body to create a chamber in cooperation with the cooling waist. In some embodiments, the chamber has a volume of about 0.03 cubic inches.

In some embodiments, the method includes axially aligning the nozzle in relation to another component in the plasma arc torch using an axial alignment flange at the inlet slope.

In some embodiments, the method includes operating the plasma arc torch at about 170 amps or less.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
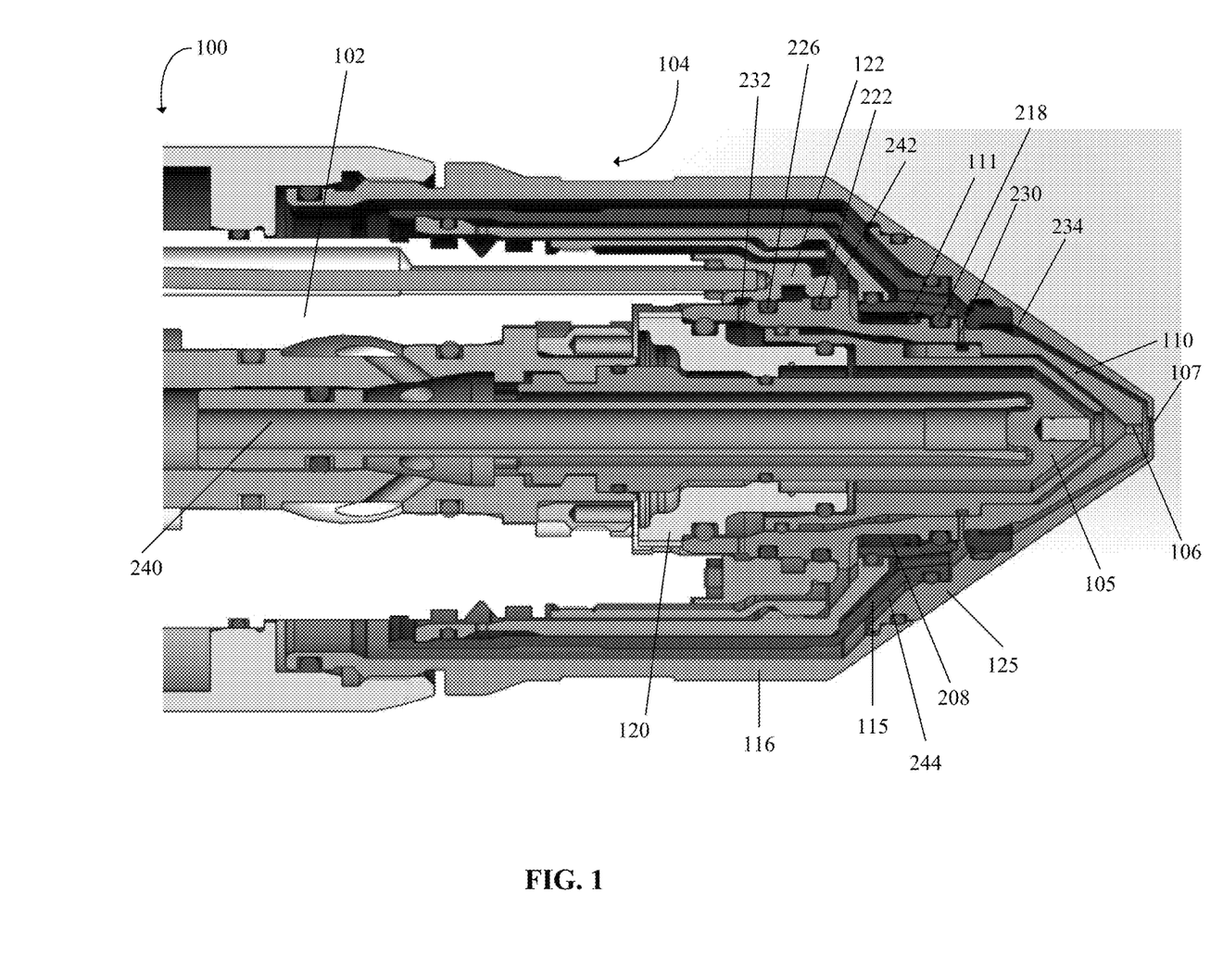
FIG. 1 is a cross-sectional view of a liquid-cooled plasma arc torch with a nozzle having a cooling waist, according to an illustrative embodiment of the present invention.

FIG. 1 is a cross-sectional view of a liquid-cooled plasma arc torch 100 with a nozzle 110 having a cooling waist 111, according to an illustrative embodiment of the present invention. The plasma arc torch 100 includes a torch body 102 having a current ring 122 and a torch tip 104 having multiple consumables, for example, an electrode 105, the nozzle 110, an inner retaining cap 115, an outer retaining cap 116, a swirl ring 120, and a shield 125. In the torch tip 104, the nozzle 110 is spaced from the electrode 105 and has a central nozzle exit orifice 106. The swirl ring 120 is mounted around the electrode 105 and configured to impart a tangential velocity component to a plasma gas flow, thereby causing the plasma gas flow to swirl. The inner retaining cap 115 is securely connected (e.g., threaded) to the torch body 102 to retain the nozzle 110 to the torch body 102 and radially and/or axially position the nozzle 110 with respect to a longitudinal axis of the torch 100. The shield 125, which includes a shield exit orifice 107, is connected to the outer retaining cap 116 that secures the shield 125 to the torch body 102. In some embodiments, the nozzle exit orifice 106 and optionally, the shield exit orifice 107, define a plasma arc exit orifice through which a plasma arc is delivered to a workpiece during torch operation. The torch 100 can additionally include electrical connections, passages for cooling, passages for arc control fluids (e.g., plasma gas). In some embodiments, the liquid-cooled plasma arc torch 100 of FIG. 1 is operated at a current of about 80 amperes.

Figure 2A:
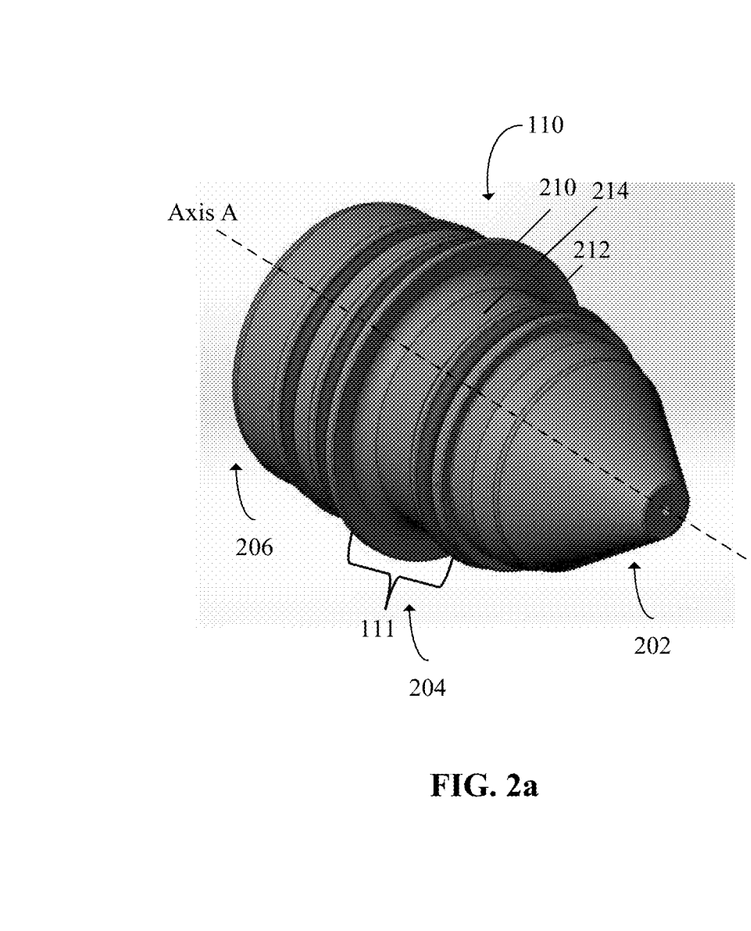
FIGS. 2a and 2b are isometric and sectional views of the nozzle of FIG. 1, according to an illustrative embodiment of the present invention.
Figure 2B:
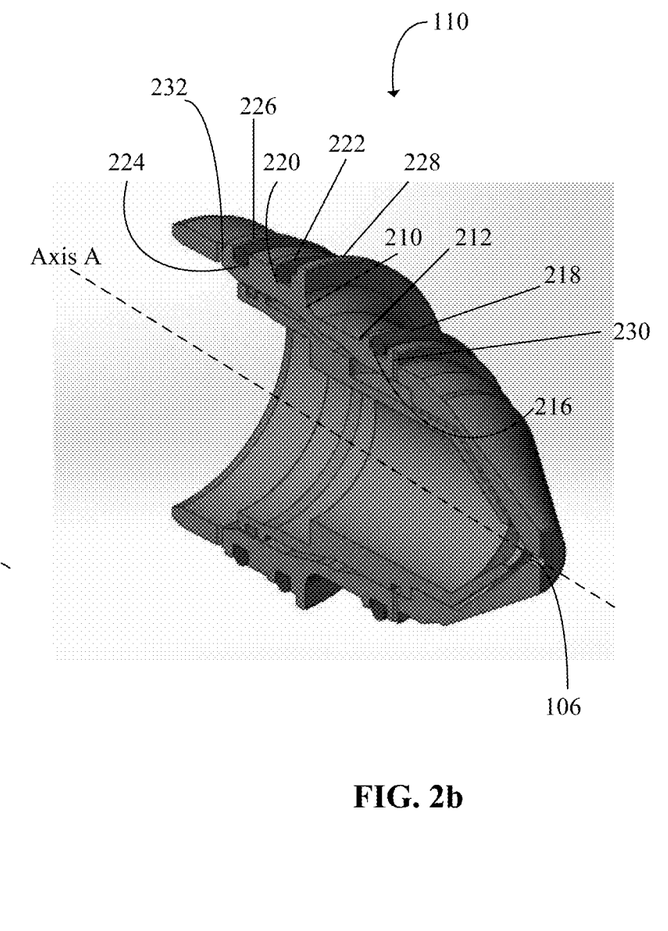

FIGS. 2a and 2b are isometric and sectional views, respectively, of the nozzle 110 of FIG. 1, according to an illustrative embodiment of the present invention. As shown, the nozzle 110 has an elongated, thermally conductive body defining a longitudinal axis A extending therethrough and includes a distal end/portion 202, a central portion 204, and a proximal end/portion 206 along the longitudinal axis A. The distal end 202 of the nozzle body is configured to define the nozzle exit orifice 106 through which a plasma jet exits the nozzle 110.

In some embodiments, the central portion 204 defines the cooling waist 111 located circumferentially about an exterior surface of the nozzle 110 for conducting a liquid flow over at least a portion of the nozzle 110. In some embodiments, the cooling waist 111 extends at least about 20% of the length of the nozzle 110 along the longitudinal axis A. As shown in FIGS. 2a and b, the cooling waist 111 is generally located in the middle of the nozzle 110 along the longitudinal axis A.

The cooling waist 111 includes a liquid inlet slope 210, a liquid outlet slope 212 and a heat exchange region 214 between the liquid inlet slope 210 and the liquid outlet slope 212. As illustrated, the liquid inlet slope 210 is proximal to the heat exchange region 214, which is proximal to the liquid outlet slope 212, such that the liquid inlet slope 210 and the liquid outlet slope 212 are at different axial locations (with respect to longitudinal axis A) separated by the heat exchange region 214. In some embodiments, the heat exchange region 214 extends substantially parallel to the longitudinal axis A, while each of the liquid inlet slope 210 and the liquid outlet slope 212 is oriented at a non-zero angle relative to the heat exchange region 214 (i.e., relative to the longitudinal axis A). In some embodiments, the length of the cooling waist 111 along the longitudinal axis A (i.e., extending from the outer edge of the liquid inlet slope 210 to the outer edge of the liquid outlet slope 212) is about 0.25 inches. The length of the relatively flat heat exchange region 214 along the longitudinal axis A is about 0.188 inches. In some embodiments, the liquid inlet slope 210 and the liquid outlet slope 212 are oriented generally perpendicular to the longitudinal axis A. In some embodiments, due in part to the axial separation between the inlet slope 210 and the outlet slope 212, the cooling waist 111 is configured to facilitate an outward radial laminar flow of a liquid coolant therethrough, such that the liquid coolant entering the liquid inlet slope 210 does not substantially intermingle with the liquid coolant exiting from the liquid outlet slope 212. Laminar flow of the liquid coolant is desirable because it provides smoother flow of a liquid coolant through the torch 100. Since the liquid coolant is adapted to move from one torch component to another, laminar coolant flow generally results in less pressure drop across the cooling circuit.

In some embodiments, the portion of the nozzle body between the liquid outlet slope 212 and the distal end 202 defines a groove 216 on its exterior surface, where the groove 216 is configured to house a first sealing member 218, which may be elastomeric, such as an o-ring. When the nozzle 110 is installed into the plasma arc torch 100, surface-to-surface contact between the nozzle 110 and the adjacent inner retaining cap 115 deforms the first sealing member 218 in the groove 216 to provide a liquid-tight seal between the nozzle 110 and the inner retaining cap 115 in that region.

In some embodiments, the portion of the nozzle body between the liquid inlet slope 210 and the proximal end 206 defines at least one groove 220 on its exterior surface, where the groove 220 is configured to house a second sealing member 222, which may be elastomeric, such as an o-ring. When the nozzle 110 is installed into the plasma arc torch 100, surface-to-surface contact between the nozzle 110 and an adjacent torch component, such as the current ring 122 of FIG. 1, deforms the second sealing member 222 in the groove 220 to provide a liquid-tight seal between the nozzle 110 and the current ring 122 in that region. Generally, the sealing members 218 and 222 are configured to confine the coolant flow to within the cooling waist 111. In some cases, the nozzle 110 is provided with a third sealing member 226 housed in a grove 224 that is located on the exterior surface of the nozzle body between the second sealing member 222 and the proximal end 206 of the nozzle 110. Thus, the third sealing member 226 is axially proximal to the second sealing member 222. The third sealing member 226 is configured to provide another liquid-tight seal between the nozzle 110 and the current ring 122.

In some embodiments, the liquid inlet slope 210 includes an alignment flange 228 extending radially from the exterior surface of the nozzle body. The alignment flange 228 is configured to axially align the nozzle 110 with another component of the plasma arc torch 100, such as the current ring 122, during assembly of the torch 100. Thus, the liquid inlet slope 210 is adapted to extend higher in a direction perpendicular to the longitudinal axis A than the liquid outlet slope 212.

In some embodiments, a supply hole 232 is positioned between the third sealing member 226 and the proximal end 206 of the nozzle body. The supply hole 232 is configured to connect an exterior surface of the nozzle body to the interior surface of the nozzle body to conduct a supply of plasma gas radially into the interior region of the nozzle 110. The third sealing member 226 can be used to direct the plasma gas to flow through the supply hole 232 and into the area between the nozzle 110 and the swirl ring 120. In some embodiments, a vent hole 230 is positioned between the first sealing member 218 and the distal end 202 of the nozzle body. The vent hole 230 is configured to connect an interior surface of the nozzle body to the exterior surface of the nozzle body to conduct a plasma gas flow radially away from the nozzle 110. For example, the vent hole 230 is in fluid communication with a shield gas supply channel 234 between an exterior surface of the nozzle 110 and an interior surface of the shield 125, as shown in FIG. 1. In operation, a plasma gas flow from the nozzle 110 can be vented to the shield gas supply channel 234 via the vent hole 230 to supplement the shield gas in the channel 234. The plasma gas vented into the shield gas channel 234 is adapted to preheat the shield gas, which adds more heat energy to a cut by the torch 100 and allows more assist gas to move the molten metal produced during the cut.

In some embodiments, a vent hole (not shown in FIG. 1, but shown as vent hole 336 in FIG. 3) is positioned between the second sealing member 222 and the third sealing member 226. The vent hole is configured to connect an interior surface of the nozzle body to the exterior surface of the nozzle body to conduct a plasma gas flow radially away from the nozzle 110. The vent hole is adapted to be connected to a vent passage, which allows ionized plasma gas from the torch 100 to vent to atmosphere.

In some embodiments, the exterior surface of the nozzle 110 at the cooling waist 111 and an interior surface of the adjacent retaining cap 115 cooperatively define a coolant chamber 208, as illustrated in FIG. 1. The coolant chamber 208 can have a volume of about 0.03 cubic inches. The coolant chamber 208 is configured to facilitate conductive cooling to other sections of the nozzle 110. For example, the relatively wide width of the coolant chamber 208 allows the cooling fluid to move quickly therethrough and the resulting high velocity flow promotes cooling.

Figure 3:
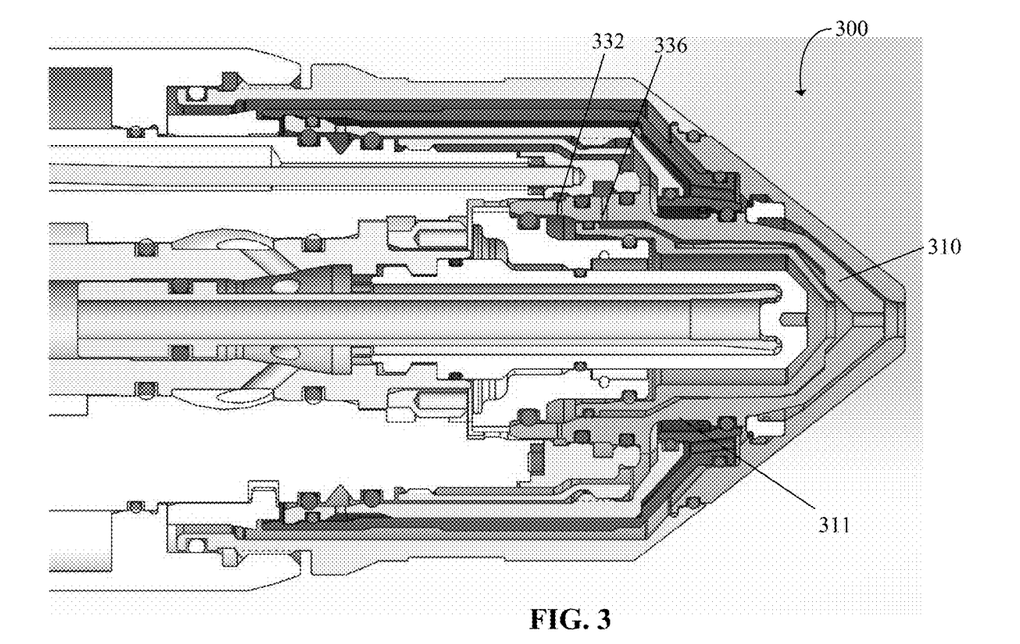
FIG. 3 is a cross-sectional view of another plasma arc torch with a nozzle having a cooling waist, according to an illustrative embodiment of the present invention.
Figure 4A:
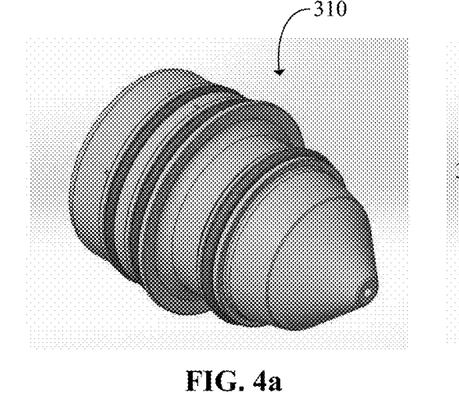
FIGS. 4a and 4b are isometric and sectional views of the nozzle of FIG. 3, according to an illustrative embodiment of the present invention.
Figure 4B:
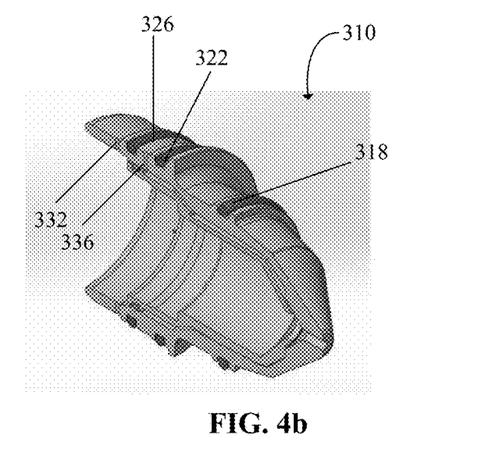

FIG. 3 is a cross-sectional view of another plasma arc torch 300 with a nozzle 310 having a cooling waist 311, according to an illustrative embodiment of the present invention. The plasma arc torch 300 can be operated at a current of about 130 amperes. FIGS. 4a and 4b are isometric and sectional views of the nozzle 310 of FIG. 3, according to an illustrative embodiment of the present invention. The nozzle 310, including the nozzle waist 311, is substantially similar to the nozzle 110 and the nozzle waist 111, respectively, of FIGS. 1, 2a and 2b. For example, same as the nozzle 110, the nozzle 310 includes a first sealing member 318 (corresponding to the sealing member 218), a second sealing member 322 (corresponding to the sealing member 222), and a third sealing member 326 (corresponding the sealing member 226). A vent hole 336 is positioned between the second sealing member 322 and the third sealing member 326 to conduct a plasma gas flow radially away from the nozzle 310 and into the torch body. As shown, the nozzle 310 additionally includes a supply hole 332, same as the supply hole 232 of the nozzle 110, positioned between the third sealing member 326 and the proximal end of the nozzle 310 to conduct a supply of plasma gas radially into the interior region of the nozzle 310. Generally, the second sealing member 322 is configured to fluidly insulate the vented plasma gas from the cooling fluid in the waist 111, and the third sealing member 326 is configured to fluidly insulate the vented plasma gas from the plasma gas supply that flows into the swirl ring 120 through the supply hole 332.

In general, a nozzle with a cooling waist, such as the nozzle 110 described above with references to FIGS. 1, 2a and 2b and the nozzle 310 described above with reference to FIGS. 3, 4a and 4b can be incorporated into a variety of plasma arc torches that require liquid cooling. For example, the nozzle and the cooling waist described in the present application can be installed in liquid-cooled torches operated at about 170 amperes or less, such as at about 170 amperes, about 130 amperes, and/or about 80 amperes.

Figure 5:
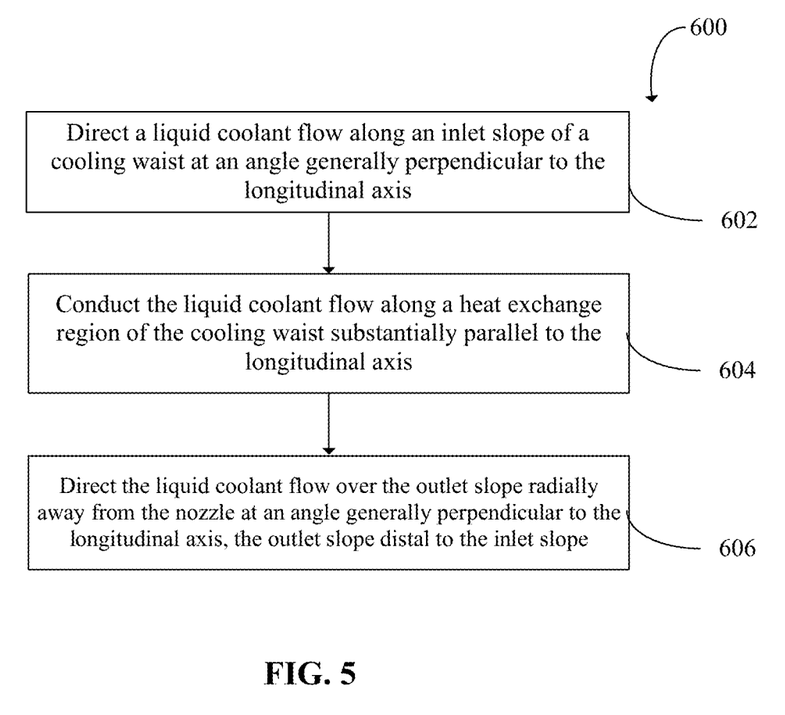
FIG. 5 is a diagram illustrating a process for liquid cooling a plasma-cutting nozzle in a plasma arc torch, according to an illustrative embodiment of the present invention.

FIG. 5 is a diagram illustrating a process 600 for liquid cooling a plasma-cutting nozzle in a plasma arc torch, according to an illustrative embodiment of the present invention. The plasma-cutting nozzle comprises a cooling waist, such as the nozzle 110 described above with references to FIGS. 1, 2a and 2b or the nozzle 310 described above with reference to FIGS. 3, 4a and 4b. For the purpose of illustration, the process 600 is described with reference to the nozzle 110. During cooling, a liquid coolant flow is directed along the inlet slope 210 of the cooling waist 111 of the nozzle 110 at a non-zero angle (step 602), such as at an angle generally perpendicular to the longitudinal axis A. The liquid coolant flow is adapted to be introduced to the inlet slope 210 from the torch body 102 via a coolant nozzle supply channel 242 that is in part formed by an interior surface of the inner retaining cap 115, as shown in FIG. 1. The heat exchange region 214 of the cooling waist 111 then conducts the liquid coolant flow axially in a distal direction toward the outlet slope 212 of the nozzle 110 (step 604), where the heat exchange region 214 is substantially parallel to the longitudinal axis A. The outlet slope 212 of the cooling waist 111 further directs the liquid coolant flow radially outward away from the nozzle 110 at a non-zero angle (step 606), such as a at an angle generally perpendicular to the longitudinal axis A.

In some embodiments, the radial outward flow of the liquid coolant allows the liquid coolant flow to travel along a coolant shield channel 244 defined between an exterior surface of the inner retaining cap 115 and an interior surface of the shield 125, as illustrated in FIG. 1. The coolant shield channel 244, in fluid communication with the outlet slope 212 of the nozzle cooling waist 111, conducts the coolant flow proximally toward the torch body 104 to further cool the shield 125 and the outer retaining cap 116. This coolant flow pattern has the advantage of reducing the space in the torch 100 used to redirect the coolant flow from the nozzle 110 to the shield 125. Specifically, it allows the coolant to directly flow from the nozzle 110 to the shield 125 without being routed back into the torch 100.

In some embodiments, the liquid coolant flow through the cooling waist 111 forms a substantially laminar flow, such that the liquid coolant entering the inlet slope 210 does not substantially intermingle with the liquid coolant exiting from the outlet slope 212. Further, the axial liquid flow from the inlet slope 210 to the outlet slope 212 is substantially even around a circumference of the nozzle 110. For example, the coolant flow enters the inlet slope 210 around substantially the entire circumference of the nozzle 110. The coolant flow then cools the heat exchange region 214 uniformly around the circumference of the nozzle 110. The coolant flow is directed away via the outlet slope 112 around the circumference of the nozzle 110. The coolant flow does not travel laterally or circumferentially within the cooling waist 111, but travels in a direction parallel to longitudinal axis A. The liquid coolant flow also does not enter from one lateral side of the nozzle 110 and exit from the other side. Rather, it is adapted to enter and exit from the same side of the nozzle 110 in a straight path generally parallel to the longitudinal axis of the nozzle 110.

In some embodiments, the process 600 includes supplying a plasma gas flow into an interior region of the nozzle 110 through a supply hole disposed in the nozzle body, such as the supply hole 232 located between the third sealing member 226 and the proximal end 206 of the nozzle 110 of FIG. 1 or the supply hole 332 located between the third sealing member 326 and the proximal end of the nozzle 310 of FIG. 3. In some embodiments, the process 600 includes venting at least a portion of the gas flow through one or more vent holes, such as the vent hole 336 of the nozzle 310 located between the third sealing member 326 and the second sealing member 322 of the nozzle 310 and/or the vent hole 230 of the nozzle 110 located between the first sealing member 218 and the distal end 202 of the nozzle 110.

It should be understood that various aspects and embodiments of the invention can be combined in various ways. Based on the teachings of this specification, a person of ordinary skill in the art can readily determine how to combine these various embodiments. Modifications may also occur to those skilled in the art upon reading the specification.

What is claimed is:

1. A nozzle for a liquid-cooled plasma arc torch, the nozzle comprising:
    a thermally conductive body having a distal end, a proximal end, and a longitudinal axis extending therethrough;
    a plasma arc exit orifice at the distal end of the thermally conductive body;
    a cooling waist located on an external surface of the body and disposed circumferentially about the exterior surface, the cooling waist including a liquid inlet slope, a liquid outlet slope and a heat exchange region between the liquid inlet slope and the liquid outlet slope, wherein the heat exchange region extends substantially parallel to the longitudinal axis, and wherein the liquid inlet slope and the liquid outlet slope are oriented generally perpendicular to the longitudinal axis such that the liquid inlet and outlet slopes extend radially outward from the external surface of the body while being disposed circumferentially about the external surface;
    a first sealing member located on the external surface between the liquid outlet slope and the distal end of the thermally conductive body; and
    a second sealing member located on the external surface between the proximal end of the thermally conductive body and the liquid inlet slope.

2. The nozzle of claim 1, wherein the liquid inlet slope and the liquid outlet slope are at different axial locations in relation to the longitudinal axis.

3. The nozzle of claim 1, wherein the cooling waist is configured to facilitate a laminar flow of a liquid coolant therethrough, such that the liquid coolant entering the liquid inlet slope does not substantially intermingle with the liquid coolant exiting from the liquid outlet slope.

4. The nozzle of claim 1, wherein the liquid inlet slope comprises an axial alignment flange configured to axially align the nozzle with another component of the plasma arc torch.

5. The nozzle of claim 1, wherein the cooling waist is generally located in a center portion of the body.

6. The nozzle of claim 1, further comprising a third sealing member located between the second sealing member and the proximal end of the body.

7. The nozzle of claim 6, further comprising a vent hole located between the third sealing member and the second sealing member, the vent hole configured to connect an interior surface of the body to the exterior surface of the body.

8. The nozzle of claim 6, further comprising a supply hole located between the third sealing member and the proximal end of the body, the supply hole configured to connect an exterior surface of the body to the interior surface of the body.

9. The nozzle of claim 1, further comprising a vent hole between the first sealing member and the distal end of the body, the vent hole configured to connect an interior surface of the body to a shield gas supply channel.

10. The nozzle of claim 1, further comprising a retaining cap coupled to the exterior surface of the body to define a chamber in cooperation with the cooling waist.

11. The nozzle of claim 10, wherein the chamber has a volume of about 0.03 cubic inches.

12. A nozzle for a liquid cool plasma torch, the nozzle comprising:
   a body having a distal end, a proximal end, and a longitudinal axis extending therethrough;
   a plasma arc exit orifice disposed at the distal end of the body;
   a cooling means centrally located on an exterior surface of the body between the distal end and the proximal end, the cooling means circumferentially oriented about the body, the cooling means having an inlet means for receiving a liquid coolant and an outlet means for redirecting the liquid coolant radially outward from the external surface of the body in a laminar flow pattern around a circumference of the external surface, the inlet and the outlet means are axially spaced from one another on the external surface;
   a first sealing means located on the external surface of the body between the outlet means and the distal end of the body; and
   a second sealing means located on the external surface of the body between the inlet means and the proximal end of the body.

13. The nozzle of claim 12, further comprising at least one venting means disposed in the body.

14. The nozzle of claim 12, wherein the cooling means is configured to prevent liquid coolant in the inlet means from intermingling with the liquid coolant in the outlet means.

15. A method for liquid cooling the nozzle of claim 1 in a plasma arc torch, the method comprising:
   directing a liquid coolant flow along the inlet slope of the cooling waist on the external surface of the nozzle body at an angle generally perpendicular to the longitudinal axis;
   conducting the liquid coolant flow along the heat exchange region of the cooling waist substantially parallel to the longitudinal axis, the heat exchange region located between the inlet slope and the outlet slope of the cooling waist on the external surface of the body; and
   directing the liquid coolant flow over the outlet slope radially outward away from the external surface of the nozzle at an angle generally perpendicular to the longitudinal axis, the outlet slope distal to the inlet slope,
   wherein the liquid coolant flow through the cooling waist comprises a substantially laminar flow such that the liquid coolant flow through the inlet slope does not substantially intermingle with the liquid coolant flow over the outlet slope.

16. The method of claim 15, further comprising sealing the nozzle by one or more of the first sealing member at a first sealing location between the outlet slope and the distal end of the body, the second sealing member at a second sealing location between the proximal end of the body and the inlet slope, and a third sealing member at a third sealing location between the second sealing member and the proximal end of the body.

17. The method of claim 16, further comprising venting at least a portion of a gas flow through at least one of a first vent hole located between the third sealing location and the second sealing location and a second vent hole between the first sealing location and the distal end of the body.

18. The method of claim 16, further comprising supplying a gas flow into an interior region of the nozzle through a supply hole located between the third sealing location and the proximal end of the body.

19. The method of claim 15, further comprising coupling a retaining cap to the exterior surface of the body to create a chamber in cooperation with the cooling waist.

20. The method of claim 19, wherein the chamber has a volume of about 0.03 cubic inches.

21. The method of claim 15, further comprising axially aligning the nozzle in relation to another component in the plasma arc torch using an axial alignment flange at the inlet slope.

22. The method of claim 15, further comprising operating the plasma arc torch at about 170 amps or less.

* * * * *